United States Patent
Karlstrand et al.

(10) Patent No.: US 8,507,795 B2
(45) Date of Patent: Aug. 13, 2013

(54) JOINT FOR A SUBMARINE CABLE

(75) Inventors: Johan Karlstrand, Karlskrona (SE); Anders Hansson, Lyckeby (SE); Björn Zettervall, Nättraby (SE); Niklas Nordé, Karlskrona (SE)

(73) Assignee: ABB Technology AG (CH)

( * ) Notice: Subject to any disclaimer, the term of this patent is extended or adjusted under 35 U.S.C. 154(b) by 40 days.

(21) Appl. No.: 13/342,504

(22) Filed: Jan. 3, 2012

(65) Prior Publication Data

US 2012/0097446 A1   Apr. 26, 2012

Related U.S. Application Data

(63) Continuation of application No. PCT/EP2010/059305, filed on Jun. 30, 2010.

(30) Foreign Application Priority Data

Jul. 3, 2009 (SE) ...................... 0900917

(51) Int. Cl.
   *H02G 3/06* (2006.01)
(52) U.S. Cl.
   USPC ............. 174/84 R; 174/88 R; 174/88 C
(58) Field of Classification Search
   USPC .............. 174/74 R, 78, 84 R, 88 R, 88 C; 439/586, 879
   See application file for complete search history.

(56) References Cited

U.S. PATENT DOCUMENTS

| | | | | |
|---|---|---|---|---|
| 2,078,051 A | * | 4/1937 | Berndt | 439/788 |
| 2,429,889 A | | 10/1947 | Morrison | |
| 4,365,947 A | * | 12/1982 | Bahder et al. | 425/384 |
| 5,006,095 A | * | 4/1991 | Suzuki | 474/111 |
| 5,278,353 A | * | 1/1994 | Buchholz et al. | 174/84 R |
| 5,406,030 A | * | 4/1995 | Boggs | 174/73.1 |
| 5,661,842 A | * | 8/1997 | Faust | 385/139 |
| 5,683,273 A | * | 11/1997 | Garver et al. | 439/784 |
| 6,364,721 B2 | * | 4/2002 | Stewart, III | 439/784 |
| 6,434,317 B1 | * | 8/2002 | Dyer et al. | 385/139 |
| 6,773,311 B2 | * | 8/2004 | Mello et al. | 439/783 |
| 8,222,524 B2 | * | 7/2012 | Norde et al. | 174/84 R |

FOREIGN PATENT DOCUMENTS

| | | |
|---|---|---|
| EP | 0113053 A1 | 7/1984 |
| EP | 0503415 A1 | 9/1992 |
| JP | 2040807 A | 2/1990 |

OTHER PUBLICATIONS

International Search Report and Written Opinion of the International Searching Authority; Application No. PCT/EP2010/059305; Issued: Apr. 7, 2011; Mailing Date: Apr. 15, 2011.

* cited by examiner

*Primary Examiner* — William H Mayo, III
(74) *Attorney, Agent, or Firm* — St. Onge Steward Johnston & Reens LLC

(57) ABSTRACT

A joint arrangement for a submarine cable, in which armoured submarine cables are joined together, the joint arrangement including a tubular enclosure into which two submarine cables to be joined are to extend and inside which conductors of the two submarine cables are joined, wherein the enclosure includes a current-carrying part arranged so as to be able of conducting at least a part of a current conducted by the armouring of the cables, and a reinforcement part provided to provide sufficient mechanical strength to the enclosure and made of a material of lower electrical conductivity than the material of the current-carrying part. The current-carrying part is integrated in the reinforcement part and forms a single unit therewith.

17 Claims, 6 Drawing Sheets

JOINT FOR A SUBMARINE CABLE

CROSS-REFERENCE TO RELATED APPLICATIONS

The present application is a continuation of pending International patent application PCT/EP2010/059305 filed on Jun. 30, 2010 which designates the United States and claims priority from Swedish patent application 0900917-6 filed on Jul. 3, 2009. The content of all prior applications is incorporated herein by reference.

FIELD OF THE INVENTION

The present invention relates generally to submarine cable arrangements and in particular to a joint in which armoured submarine cables are joined together, said joint comprising a tubular enclosure into which two submarine cables to be joined are to extend and inside which conductors of the two submarine cables are joined, wherein said enclosure comprises a current-carrying part arranged so as to be able of conducting at least a part of a current conducted by the armouring of the cables, and a reinforcement part provided to provide sufficient mechanical strength to said enclosure and made of a material of lower electrical conductivity than the material of the current-carrying part.

BACKGROUND OF THE INVENTION

In single core submarine cables, there is used an armouring, normally formed by copper wires (though steel wires may also be used), to provide mechanical strength to the cable since the latter will be subjected to considerable tension when placed in its operative position at sea. Accordingly, the armouring plays a vital role for the strength of the cable. The armouring also acts as a carrier of electric current, and the current conducted by the armouring may be very large, even as large as the one conducted by the conductor of the cable. Apart from the armouring, sea cables also typically comprise a water barrier made of a layer of a material provided for the purpose of preventing water from reaching and having a detrimental effect on the electric insulation that is provided around the conductor. The water barrier is positioned underneath the armouring, normally divided from the latter by a polymer layer, and made of metal, such as aluminium or lead.

Cable joints are used for the purpose of interconnecting cables. Since some parts of the cable, such as the water barrier and the armouring, are stripped off from the cable in the region of the joint, the joint enclosure must provide for the functionality of said parts. Accordingly, joint enclosures are provided with elements that functionally correspond to the armouring and the water barrier. Prior art comprises joints in which there is provided a first casing that has as its task to provide the function of the water barrier and also to withstand the hydrostatic pressure that can be expected at the level at which the cable is to be located when in its operative position. Another, second casing is provided around the first casing and has the task of mainly adopting the mechanical load that the cable armouring is subjected to. The second casing may be a set of wires or may have more of a tubular design. Typically, the armouring of the cables is cut off at a certain point and the remaining armouring wire ends are positioned on a cone-shaped ring that forms a part of the joint enclosure. A further ring element is slid onto the cone-shaped ring such that the armouring wires are clamped between the inner periphery of the further ring element and the outer periphery of the cone-shaped ring. Screws extending in a generally radial direction are used for tightening the further ring element against the cone-shaped ring.

The enclosure is subdivided in two parts, each of which is applied to a respective cable. During assembly of the enclosure, after joining of the cable conductors in a manner known per se, the two enclosure halves are joined. Accordingly, in the case of an inner first casing and an outer second casing, each casing is subdivided in two halves, whereby the first casing is assembled first and the second casing is assembled subsequently and outside the first casing.

Since, normally, the second casing is made of a material that is less conductive but mechanically stronger material than the material of the armouring, it is not able of conducting the same current as the latter. Therefore, a further conducting element, typically a copper wire arrangement or the like, is connected to the ring to which the armouring wires are connected and led, outside the second casing, from one end of the joint enclosure to the other end, where it is correspondingly connected to the other end of the joint enclosure. Outside the second casing, and around said further conducting element, there is provided a filler medium such as asphalt or the like, which in its turn is enclosed in a cone-shaped body (typically two conical protective bodies), typically made of metal, that cover the ends of the joint enclosure and prevents bending of the cables in those regions. Around the enclosure and the protection cones, a heat shrink of an electrically insulting material may be arranged for the purpose of preventing galvanic corrosion in the joint, especially corrosion caused by the use of steel in the second casing and the copper of the armouring, and also for protecting the joint enclosure against damage and wear.

The whole joint, including the joint enclosure, is rather large, having a length of several meters, and there is a desire to make it as compact as possible without thereby sacrificing its functionality. It is also a desire to facilitate the assembly of the joint arrangement as far as possible.

SUMMARY OF THE INVENTION

It is an object of the invention to provide a joint for a submarine cable which is more compact than corresponding joints of prior art but yet fulfils the functionality requirements thereon. It is also an object to present a joint enclosure design that facilitates assembly of the enclosure, in particular assembly at site, i.e. at a sea vessel from which the cable is positioned into the sea.

This object is achieved by providing a joint for a submarine cable, in which submarine cables are joined together. The joint comprises a tubular enclosure into which two submarine cables to be joined are to extend and inside which conductors of the two submarine cables are joined, wherein said enclosure comprises a current-carrying part arranged so as to be able of conducting at least a part of a current conducted by the armouring of the cables, and a reinforcement part provided in order to provide sufficient mechanical strength to the joint enclosure and made of a material of lower electrical conductivity than the material of the current-carrying part. The current-carrying part is integrated in the reinforcement part and forms a single unit therewith. Accordingly, the invention does not prescribe the use of a separate casing for the adoption of the mechanical loads and a separate further conductor element for the conduction of the current, as has been used so far in prior art. Apart from a more compact design the invention also results in a simplified assembly of the joint.

In a preferred embodiment the reinforcement part comprises a tubular casing extending from one end of the enclosure to the other and forming a watertight obstacle against intrusion of water into the interior of the enclosure. Thereby, the reinforcement part also plays the role of a water barrier, corresponding to the above-mentioned first casing of prior art, whereby such a separate barrier is dispensed with. The reinforcement part is dimensioned so as to withstand an elevated hydrostatic pressure that it will be subjected to at the sea level at which it will be positioned.

Preferably, the tubular casing comprises a first tubular part through which a first cable is to extend into the casing and a second tubular part through which a second cable is to extend into the casing, wherein said first and second parts are connected to each other by a watertight weld. Joining by means of welding contributes to a more perfect water tightness of the casing.

In another preferred embodiment the casing is at least partly made of steel, preferably stainless steel, which has the advantage of being a cost efficient alternative that presents the requested mechanical properties as well as being relatively easy to weld.

In yet another preferred embodiment the reinforcement part is in direct contact with the current-carrying part. The current-carrying part is attached to the reinforcement part, forming one and the same body therewith. The current carrying part and the reinforcement part may be regarded as electrically connected in parallel with each other between the armouring of two cables joined in the joint. Current will be carried by the respective part in relation to the resistance of said part. Depending on how the current-carrying part is attached to the reinforcement part, it will to a certain degree contribute to the adoption of mechanical loads that would otherwise be adopted by the reinforcement part alone. Accordingly, the reinforcement part and the current-carrying part will supplement each other's functionality.

In a further preferred embodiment the current-carrying part comprises bars made of copper.

In a preferred embodiment the current-carrying part comprises opposite end rings to which said bars and the casing of the reinforcement part are connected by means of a weld. The provision of rings of the material of higher conductivity in the end regions of the enclosure provides for a high conductivity in the transition region between armouring and the enclosure. The use of a weld between the reinforcement part and said rings as well as between said bars and said rings provides for a good sealing against water intrusion and for good conducting properties.

Preferably, the joint arrangement comprises an armouring ring to which the armouring of a cable is to be attached by means of welding. Welding as a means of connecting the armouring with the joint enclosure improves the reliability of the connection. Preferably, the armouring ring is made of a material that has an electrical conductivity that is equal to or higher than that of the armouring, in order to provide for good conducting properties. Preferably, the armouring ring is made of the same material as the armouring of the cable to be used in the joint, preferably copper.

According to a preferred embodiment, the armouring ring comprises grooves in which armouring wires of the armouring of a cable are to be inserted before being attached to said ring by means of welding. Thereby positioning and welding of the armouring wires is facilitated.

The above-mentioned end rings that form the ends of the enclosure are attached to a respective armouring ring. Preferably they are attached to the armouring rings by means of bolts extending in the longitudinal direction of the joint. Thereby, the tension of the armouring of the cables, when attached to the armouring rings, can be set by tightening or loosing of said bolts. Furthermore, it is preferred that, after tightening of the bolts, there is also provided a weld joint between each end ring and its associated armouring ring, in order to improve electrical conductivity between these elements.

In a preferred embodiment said joint enclosure is enclosed by an insulating layer, preferably a heat shrink of rubber material or PUR. Thereby, galvanic corrosion between parts of different material in the enclosure, in particular between the steel of the reinforcement part and the copper of the current-carrying part is prevented.

In one embodiment the joint arrangement comprises a first submarine cable and a second submarine cable, each of which comprises an electric conductor, wherein the electric conductors of said cables are joined in said joint.

Further features and advantages of the invention will be presented in the following detailed description and in the annexed claims.

BRIEF DESCRIPTION OF THE DRAWINGS

The invention will now be described, for exemplary purposes, in more detail by way of embodiments and with reference to the annexed drawing on which.

DETAILED DESCRIPTION OF THE INVENTION

Figure 1:
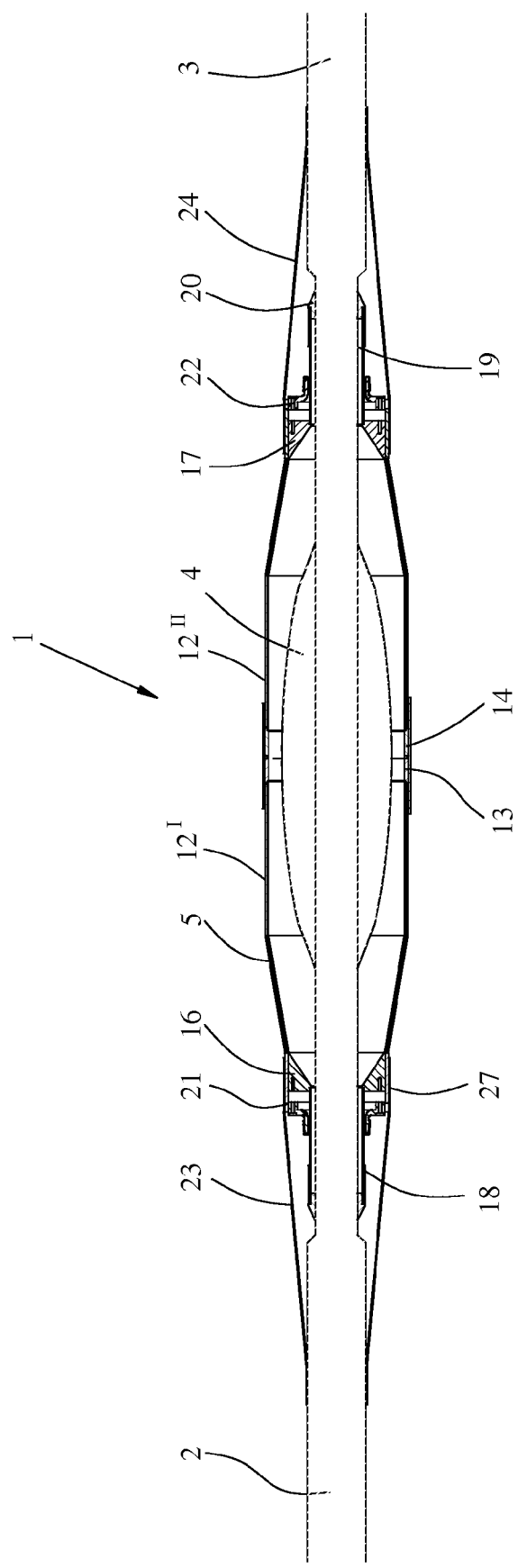
FIG. 1 illustrates an embodiment of a submarine cable joint arrangement according to the invention.
Figure 2:
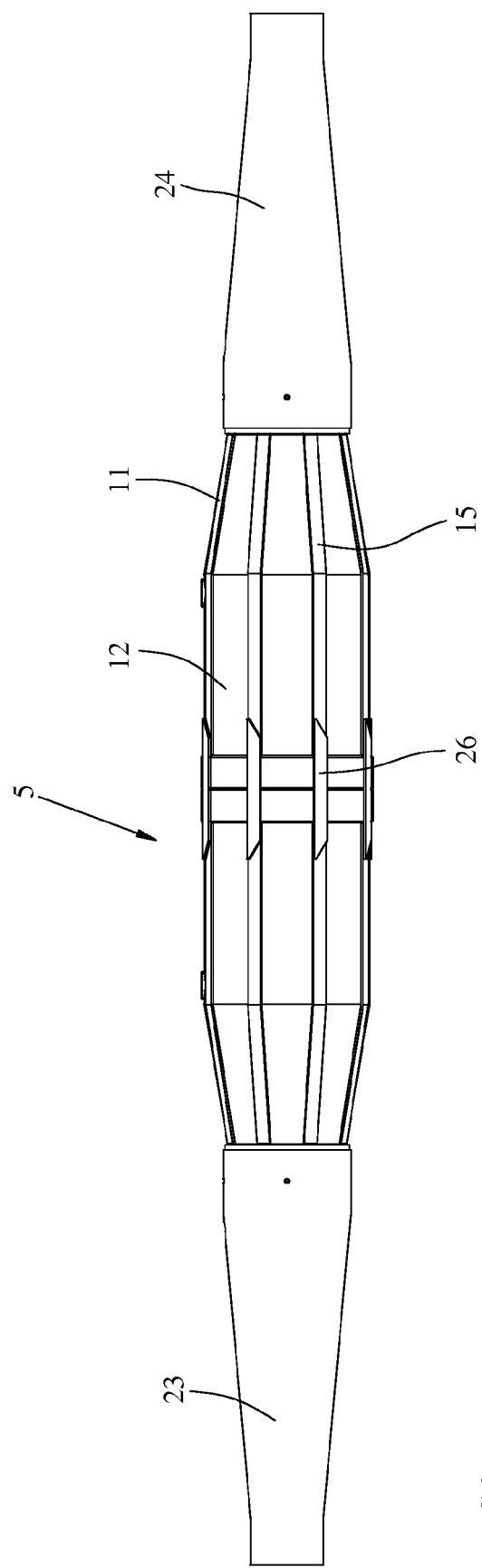
FIG. 2 is a side a perspective view showing the joint arrangement shown in FIG. 1.
Figure 3:
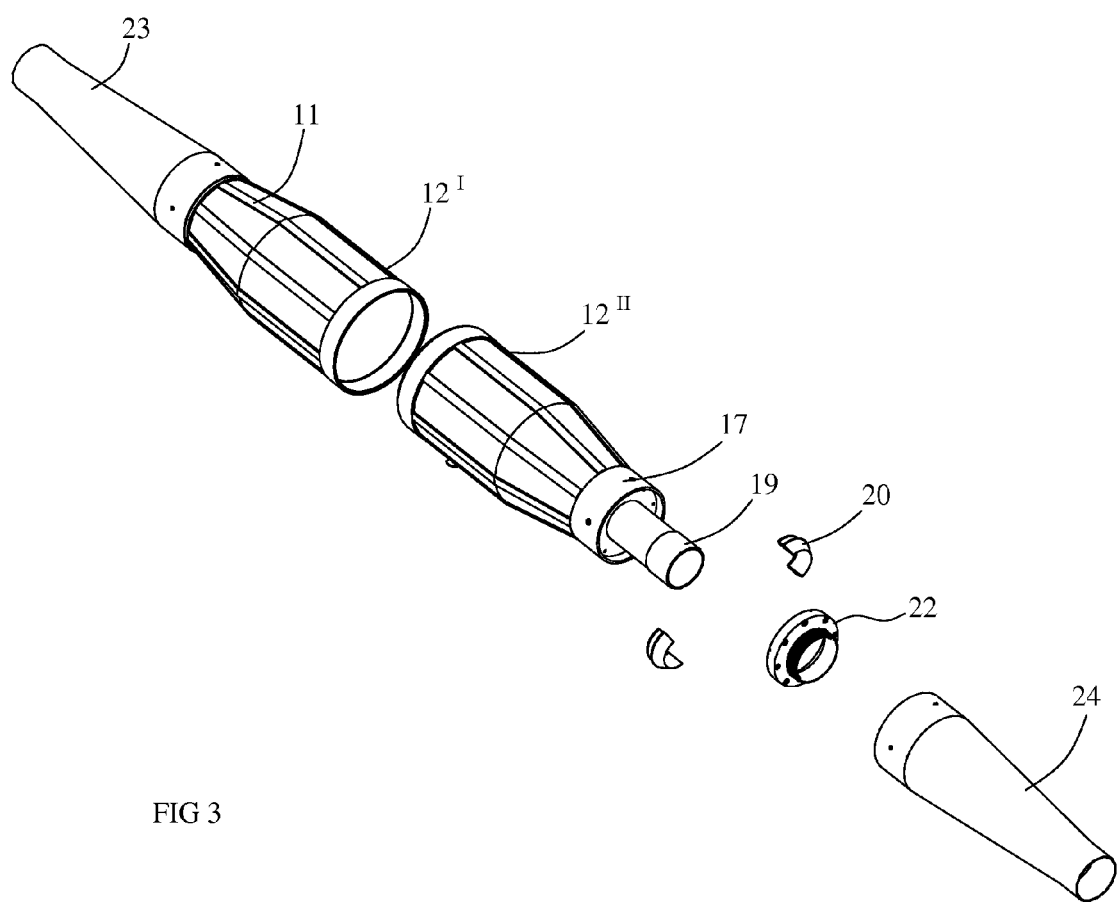
FIG. 3 is an exploded view showing separate parts of an enclosure of the joint arrangement in FIG. 1.

FIG. 1 is a cross section of a cable joint arrangement 1 according to an embodiment of the invention. In said arrangement two submarine cables 2, 3 are joined by means of a joint 4 which is enclosed by a joint enclosure 5. In the region of the joint 4 the conductors of the cables 2, 3 are uncovered and joined in a suitable manner, such as by means of copper net, Nitto tape, fire resistant cloths and glass fibre tape wrapped around the conductor ends.

Figure 6:
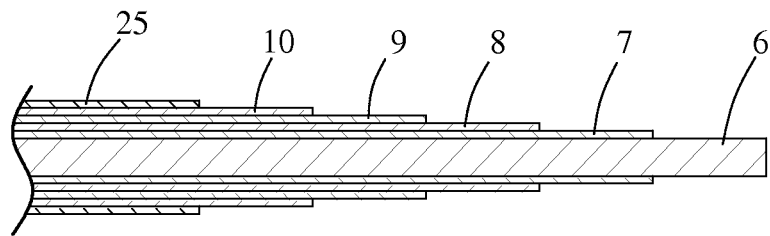
FIG. 6 shows the main parts of a submarine cable to be joined with a corresponding cable in a cable joint arrangement according to the invention.
Figure 7:
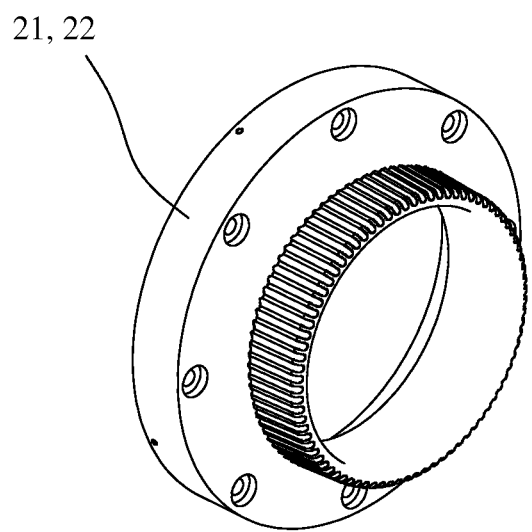
FIG. 7 shows an armouring ring according to an embodiment of the invention.

With reference to FIG. 6, schematically showing the main elements of a submarine cable, the cables 2, 3 are submarine cables typically comprising, from the core and outwards, at least one conductor 6, an electric insulation layer 7, a water barrier layer 8, possibly a further insulating layer 9, an armouring 10, and a protecting but not electrically insulating layer 25 on top of the armouring 10. Typically, the water barrier 8 is made of a metal such as lead, and the armouring 10 is formed by copper wires wound in a helical manner around the adjacent layer. The armouring 10 is arranged such as to adopt considerable mechanical loads that the cable 2, 3 may be subjected to when being in its operational position in the sea. It is also arranged so as to carry a considerable electric current, which might even be as large as the current in the conductor 6.

In the region of the joint 4, the armouring 10 of the cables is stripped of from the latter. Accordingly, the joint enclosure 5 is arranged so as to replace the functionality of the armouring 10 in the region of the joint arrangement 1. In other words, it needs to be able of conducting a high electrical current as well as being mechanically strong enough to be able to adopt the mechanical loads normally adopted by the cable armouring 10. Therefore, the enclosure 5 comprises a current-carrying part 11 arranged so as to be able of conducting at least a part of a current conducted by the armouring 10 of the cables 2, 3, and a reinforcement part 12 provided to provide sufficient mechanical strength to said enclosure 5 and made of a material of lower electrical conductivity, but higher mechanical strength, than the material of the current-carrying part 11. The current-carrying part 11 is integrated in said reinforcement part 12 and forms a single unit therewith. More precisely, the current-carrying part 12 is directly attached to the surface of the reinforcement part 11, preferably by means of soldering or by means of weld joints. More precisely, the current carrying part 11 comprises a plurality of bars 15, preferably made of copper, extending in the longitudinal direction of the joint arrangement from one end of the enclosure 5 to the other end thereof, each bar being attached to an outer surface of the reinforcement part, and thereby making contribution to the mechanical strength of the latter. In particular during assembly of the joint enclosure 5 it is of advantage to have the current-carrying part 11 integrated with the reinforcement since it facilitates the handling and assembly.

The reinforcement part 12 comprises a tubular casing made of metal, preferably steel, yet preferably stainless steel, and extending from one end of the enclosure 5 to the other thereof. Apart from imparting mechanical strength to the enclosure 5, the reinforcement part 12 therefore also forms a watertight obstacle against intrusion of water into the interior of enclosure 5. The bars 15 of the current-carrying part 12 extend on the outside of the casing of the reinforcement part 11.

Figure 4:
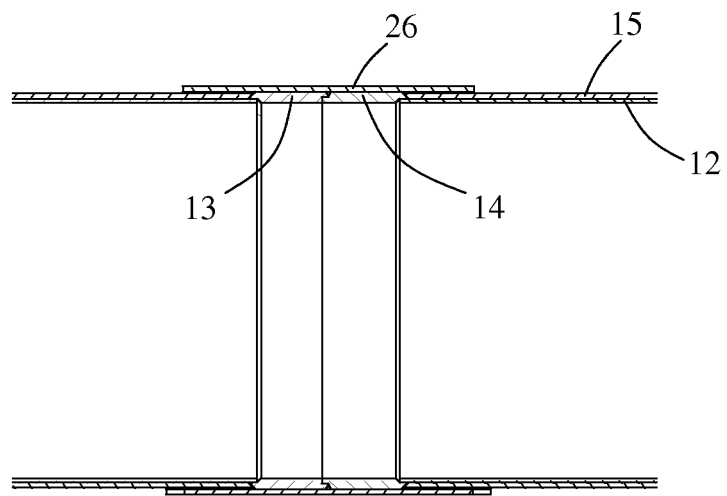
FIG. 4 shows the joint enclosure in the region where two halves thereof are connected.

The tubular casing of the reinforcement part 12 comprises a first tubular part 12' through which the first cable 2 extends into the casing and a second tubular part 12" through which the second cable 3 extends into the casing. The two parts 12', 12" are joined by means of a weld joint. More precisely, each part comprises a respective ring 13, 14 to which the sheet material of respective part 12', 12" is attached, preferably by means of a weld joint, and these rings 13, 14 are joined by means of a weld joint extending in a circumferential direction (and applied after provision of the cable joint 4). The rings 13, 14 are made of a material that is suitable for welding, such as steel, preferably stainless steel. In the region of said rings 13, 14, the copper bars 15 of the current-carrying part 11 located on a respective tubular part 12', 12" of the reinforcement part are separated by said rings 13, 14, as can be seen in FIG. 4. Therefore, in order to obtain continuity of the current carrying part 11 across said rings 13, 14, bridges of copper bars 26 are positioned across the rings and interconnected adjacent copper bars 15 of the two tubular parts 12', 12". The bridges 26 are connected to the bars 15 by means of soldering or welding, the latter alternative resulting in an improved mechanical strength and larger contribution the mechanical strength of the enclosure as a whole.

In the opposite ends of the enclosure 5 that are turned away from each other, the enclosure comprises a respective ring 16, 17 made of a metal of higher electrical conductivity than the material of the casing of the reinforcement part 12. Preferably, said rings 16, 17 are made of the same metal as the current-carrying part 11. The current-carrying part 11 as well as the reinforcement part 12 is directly connected to the rings 16, 17, preferably by means of weld joints, such that a water tight joint is established between each ring 16, 17 and its respective reinforcement part 12. On the inner periphery of each of said rings 16, 17 a sleeve 18, 19 projects from the respective ring 16, 17 and out from the enclosure 5. For the description of these features reference is in particular made to FIG. 5. These sleeves are used for the purpose of forming a watertight joint with the water barrier of each respective cable 2, 3. The sleeves 18, 19 will bear on the outer periphery of the exposed water barrier 8 of a cable and the transition region between sleeve 18, 19 and water barrier 8 will be sealed by means of soldering. For this purpose, a cone-shaped soldering ring 20 is applied at said transition region, and a soldering is applied onto said soldering ring, such that it covers the transitions between soldering ring 20 and water barrier 8 and between soldering ring 20 and sleeve 18, 19. In one end thereof, more precisely the one turned away from the adjacent sleeve 18, 19 the soldering ring 20 has an outer diameter approximately equal to the diameter of the outer periphery of the water barrier 8, and at the other end the soldering ring 20 has an outer diameter approximately equal to the outer diameter of the sleeve 18, 19, such that smooth transitions are obtained and soldering is facilitated.

At each end of the joint enclosure 5 there is also provided an armouring ring 21, 22 to which the armouring 10 of the respective cable 2, 3 is connected. Each armouring ring 21, 22 comprises grooves 23, one for each armouring wire, in which armouring wires of the armouring 10 are inserted before being attached to said armouring ring 21, 22 by means of welding. The armouring rings 21, 22 are positioned adjacent to and connected to the end rings 16, 17 of the enclosure 5 by means of bolts 27 extending in the longitudinal direction of joint arrangement. Thereby, tensioning of the armouring wires attached to the respective armouring ring 21, 22 is enabled by means of tightening of the bolts that connect the ring end rings 16, 17 of the enclosure 5 with the armouring rings 21, 22. The armouring ring 21, 22 overlap its respective end ring 16, 17 slightly in the longitudinal direction of the joint arrangement such that there is only a small gap independently of the degree of tightening of the bolts. After the tightening of the bolts, a weld joint is provided between the armouring ring 21, 22 and the associated end ring 16, 17 in the region of said gap, in order to further improve the joint and to guarantee good electrical conductivity between armouring ring 21, 22 and end ring 16, 17.

After the above-mentioned soldering, and when the armouring rings 21, 22 have been joined to the end rings 16, 17, a respective protective cone 23, 24, preventing bending of the cable in the region of the soldering, is applied onto each end of the enclosure 5. Preferably, each protective cone 23, 24 is made of a metal and extends along an end part of the enclosure 5, thereby covering the above-mentioned soldering between sleeves 18, 19 and water barrier 8 and the transition region between the enclosure 5 and the armouring rings 21, 22. The space between each cone and the part that it covers is filled with filler such as sand or asphalt, introduced through a hole in the cone 23, 24 once the cone has been positioned in its operative position on the cable/joint enclosure. Finally, the whole joint enclosure 5, including the protective cones 23, 24 is covered by an electric insulation, preferably a heat shrink of a material such as rubber, in order to prevent galvanic corrosion between parts of different metals in the joint arrangement, in particular between copper parts and parts made of stainless steel.

Figure 5:
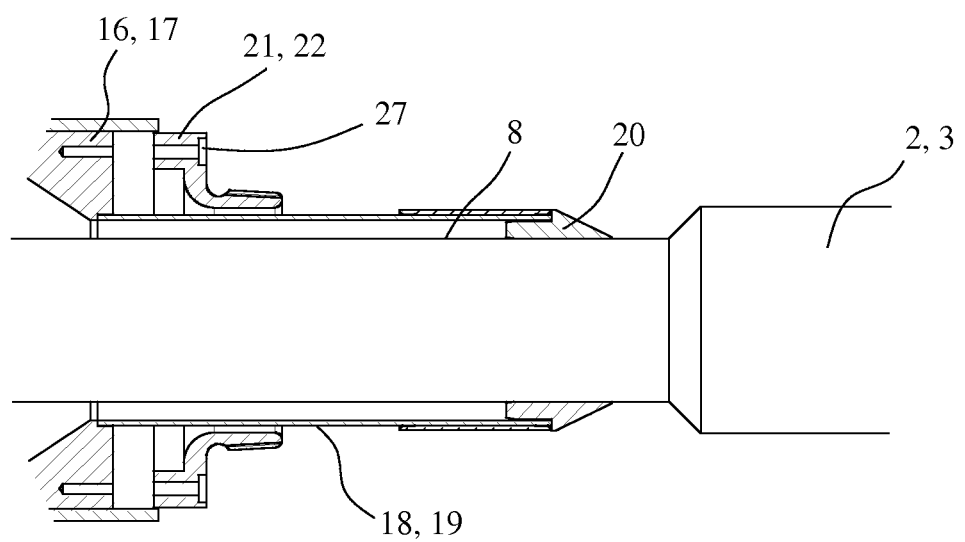
FIG. 5 shows the end region of the joint enclosure in FIG. 1 in a larger scale.
Figure 8:
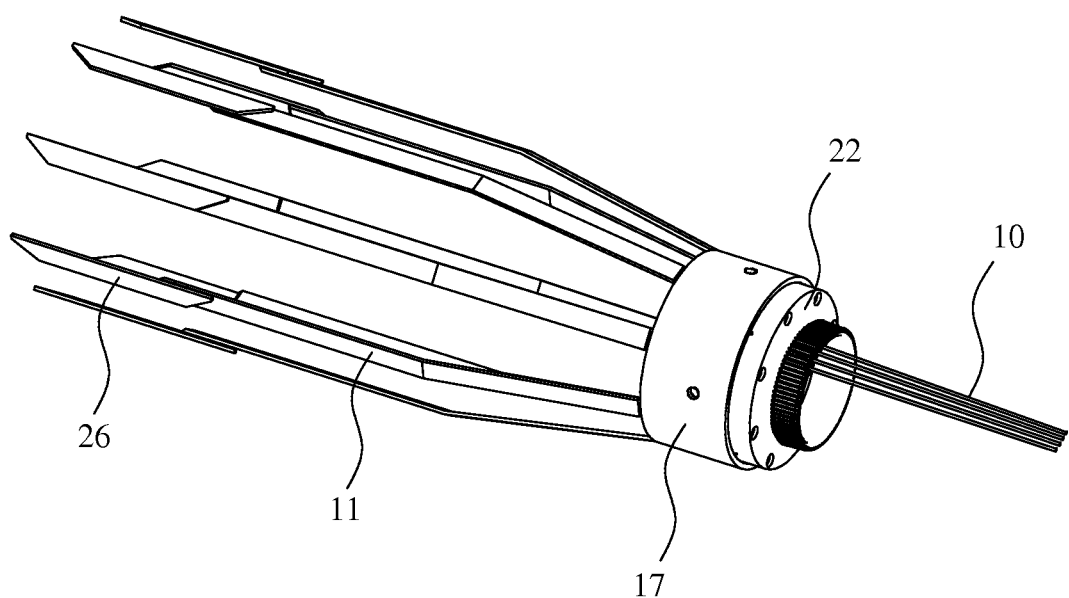
FIG. 8 is a perspective view showing the principle of connection of armouring wires to the armouring ring shown in FIG. 7.

It should be mentioned that in FIGS. 1 and 5 it has not been shown how the armouring wires of the armouring 10 of the cables 2, 3 extend from the cable and are attached in the grooves of the armouring ring 21, 22. This is only for clarity reasons. It should be understood that that the wires extend from the point at which it can be seen that the diameter of the cable 2, 3 changes in FIGS. 1 and 5 and up to the point where they engage the grooves of armouring ring 21, 22. However, this has been indicated in FIG. 8.

What is claimed is:

1. A joint arrangement for a submarine cable, in which armoured submarine cables are joined together, said joint arrangement comprising a tubular enclosure into which two submarine cables to be joined are to extend and inside which conductors of the two submarine cables are joined, wherein said enclosure comprises a current-carrying part arranged so as to be able of conducting at least a part of a current conducted by the armouring of the cables, and a reinforcement part provided to provide sufficient mechanical strength to said enclosure and made of a material of lower electrical conductivity than the material of the current-carrying part, characterised in that said current-carrying part is integrated in said reinforcement part and forms a single unit therewith.

2. The joint arrangement according to claim 1, characterised in that said reinforcement part comprises a tubular casing extending from one end of the enclosure to the other and forming a watertight obstacle against intrusion of water into the interior of enclosure.

3. The joint according to claim 2, characterised in that the tubular casing comprises a first tubular part through which a first cable is to extend into the casing and a second tubular part through which a second cable is to extend into the casing, and that said first and second parts are connected to each other by a watertight weld.

4. The joint arrangement according to claim 2, characterised in that said casing of the reinforcement part is at least partly made of steel.

5. The joint arrangement according to claim 2, characterised in that said casing is in direct contact with the current-carrying part.

6. The joint arrangement according to claim 5, characterised in that said current-carrying part comprises a plurality of bars extending outside said casing in the longitudinal direction of the joint arrangement.

7. The joint arrangement according to claim 6, characterised in that said bars are made of copper.

8. The joint arrangement according to claim 7, characterised in that said current-carrying part comprises opposite end rings to which said bars and the casing are connected by means of weld joints.

9. The joint arrangement according to claim 1, characterised in that said current-carrying part is arranged so as to electrically interconnect the armouring of two submarine cables joined inside the enclosure.

10. The joint arrangement according to claim 9, characterised in that said current-carrying part is electrically connected to the armouring of the cables by welding.

11. The joint arrangement according to claim 1, characterised in that it comprises an armouring ring to which the armouring of a cable is to be attached by means of welding.

12. The joint arrangement according to claim 11, characterised in that the armouring ring comprises grooves in which armouring wires of the armouring are inserted before being attached to said ring by means of welding.

13. The joint arrangement according to claim 1, characterised in that it comprises an end ring which forms an end of said enclosure and to which the reinforcement part and the current-carrying part are attached and which is attached to the armouring ring.

14. The joint arrangement according to claim 13, characterised in that said end ring is attached to the armouring ring by means of bolts extending in the longitudinal direction of the joint arrangement.

15. The joint arrangement according to claim 1, characterised in that said joint enclosure is enclosed by an electrically insulating layer.

16. The joint arrangement according to claim 1, characterised in that it comprises a first submarine cable and a second submarine cable, each of which comprises an electric conductor, wherein the electric conductors of said cables are joined in a joint in said joint arrangement.

17. The joint arrangement according to claim 16, characterised in that each of said cables comprises a water barrier and an armouring, and in that the joint enclosure is arranged so as to replace the water barrier and the armouring of the cables in the region of the joint.

* * * * *